United States Patent Office 2,772,151
Patented Nov. 27, 1956

2,772,151
CORRECTION OF IRON DEFICIENCIES IN GROWING PLANTS

Alexander A. Nikitin, College Park, Ga., assignor to Tennessee Corporation, New York, N. Y., a corporation of New York No Drawing. Application February 20, 1956,
Serial No. 566,394

6 Claims. (Cl. 71—1)

This invention relates to the correction of chlorotic conditions in plants grown in soils lacking adequate amounts of iron in available forms. This application is a continuation-in-part of my prior applications Serial No. 336,640, filed February 12, 1953, now abandoned; Serial No. 353,914 filed May 8, 1953, now abandoned; and Serial No. 510,524 filed May 23, 1955 as a continuation-in-part of Serial No. 336,640.

It is well known that soils deficient in certain minerals known to be essential do not produce vigorous healthy plant growth. In particular, iron deficiency results in a diseased condition known as chlorosis because of loss of chlorophyll and consequent yellowing of foliage. Correction of such chlorotic conditions can be attempted by the application of iron compounds either to the soil or to the plant itself. Prior to the present invention, however, the results obtained by these methods were unsatisfactory. It appears that iron deficiency is the most difficult of all trace element deficiencies to correct. Tests at the Florida Experiment Station showed that soil treatment and spraying with ordinary iron salts and iron chelates were ineffective. These results also proved that when regular soluble salts, such as iron sulfate, were used for soil treatment, iron was not taken up from these soluble salts apparently due to hydrolysis and consequent formation of iron oxide. Also spray treatments using iron sulfate or iron oxide were not effective, causing green spots to form on the leaves. New growth on deficient plants, following these sprays, was usually chlorotic. The inefficiency of sprays containing ordinary iron salts in correcting iron chlorosis has been interpreted as a result of rapid immobilization of these iron salts in the plant leaves.

The present invention involves the discovery that when ferrous oxalate is applied to the chlorotic plant or added to the soil in which it is growing, chlorotic conditions are very rapidly eliminated. In comparative spray tests with chelated iron and some other iron compounds, on adjacent plots, ferrous oxalate was applied as a spray to numerous subtropical ornamental trees, shrubs and grasses, which previously had shown extreme chlorosis. The restoration of these plants to a deep green color was outstanding and rapid in the case of ferrous oxalate treatment.

Ferrous oxalate can be used very effectively to correct iron deficiencies of both acid and alkaline soils. At the above-mentioned Florida Experiment Station at Homestead, Florida, for example, the soil is very alkaline and has a pH of about 8. It can be applied to the soil in any suitable manner, being simply mixed with the soil preferably by admixture with other fertilizer materials. For treatment of foliage, it is safe to use and does not injure the plant. It can be applied as a dust or spray, and in either case it can be mixed with organic insecticidal and fungicidal materials with which it is compatible. The amount to be used will vary depending on the extent of the soil deficiency, the ages and types of the plants to be treated, the rainfall, etc. For most purposes from 1.0 to 4 lbs. per 100 gallons of spray water will give best results. The concentration at which ferrous oxalate is used as a dust ranges from 4 to 12 lbs. of ferrous oxalate per 100 lbs. of dust mixture. The optimum concentration in any case depends upon the severity of chlorosis in the plant.

The exact mode of action of ferrous oxalate cannot yet be stated with certainty. It is apparently somewhat similar to that of the chelating agent now on the market (ethylenediamine tetraacetic acid), but more effective. Ferrous oxalate apparently retains iron in a non-ionic state, even under severe conditions. Even after remaining in the soil for long periods, the iron is much more readily available to the plants than in the case of other iron compounds heretofore tested. Also ferrous oxalate acts as a buffer against any toxic effects of excessive quantities of manganese that are sometimes present in the soil. On foliage, ferrous oxalate causes no injurious effects, remains for a long time without leaching away, and is most effective in correcting chlorotic conditions and promoting rapid recovery of the plants.

In summary, the advantages of using ferrous oxalate for the above purposes include:

1. It is chemically stable, even when exposed to atmospheric action over long periods of time, and especially when exposed to sunlight.

2. The inherent physical properties of ferrous oxalate, as received from the dryer, are such that it does not need additional grinding, being very finely divided. Ferrous oxalate thus may be spray-dried or flash-dried, making the manufacturing process extremely economical.

3. Ferrous oxalate is much more economical in comparison with chelated compounds, from the standpoint of low cost of the raw materials and plant equipment, and simplicity in its manufacture.

4. From the safety standpoint, ferrous oxalate is particularly valuable since it can be used for plant treatment at a wide range of concentrations, without causing any injury. Overdosing does not cause plant injury. From 1 to 4 pounds per 100 gallons of spray have been used safely; however, these amounts are not limiting.

5. Ferrous oxalate is compatible with insecticidal and fungicidal materials in general.

6. Soil application of ferrous oxalate shows promising results on vegetable crops.

As already noted, the above named advantages render ferrous oxalate superior to other iron salts and highly advantageous for use. The related compound ferric oxalate, for example, causes foliage injury, even when used for foliar treatment at very low concentrations as compared with ferrous oxalate. Furthermore ferric oxalate is not compatible with insecticidal and fungicidal materials, is unstable and decomposes on exposure to sunlight and is much more difficult to manufacture and more expensive to use than the ferrous salt. Above all, however, in comparative tests on adjacent plots ferrous oxalate was effective in restoring deep green color, for example in green peppers, while ferric oxalate produced no detectable recovery to green color but instead caused injury to foliage.

The reasons for these surprising differences in results are obscure and not fully understood at present. However, ferrous oxalate has been used successfully to restore healthy green color to chlorotic iron-deficient plants of wide variety including ornamental shrubs such as azalea, camellia, gardenia, hibiscus, and rose, vegetables such as green peppers, potatoes and tomatoes, grains such as corn, oats, and sorghum, grasses such as centipede, St. Augustine, carpet and Pangola, and fruits such as citrus, blueberries, peaches and strawberries.

Although as stated above and in my aforesaid patent application Serial No. 353,914, ferrous oxalate is compatible with fungicidal and insecticidal materials in general, it has been found that this is not the case with regard to one of the most widely used inorganic fungicides, i. e., basic copper sulfate (e. g., $CuSO_4 \cdot 3Cu(OH)_2 \cdot H_2O$). It appears that the ferrous oxalate reacts with the basic copper sulfate with a resultant undesirable increase in the solubility of both materials and injury to the foliage of the growing plant.

The incompatibility of ferrous oxalate and basic copper sulfate in the absence of a stabilizing agent is evident from the facts that the solubility of ferrous oxalate in water at ordinary temperatures is only about 6 p. p m., and that of basic copper sulfate is only about 3 p. p. m., whereas when they are mixed together in approximately equal proportions, the solubility of the ferrous oxalate increases to 130 p. p. m. and that of the basic copper sulfate increases to 160 p. p. m. The known practice of using alkaline materials, such as calcium and magnesium hydroxides and sodium carbonate, to reduce the solubility of inorganic compounds cannot be utilized in this case because of adverse effects of these alkaline materials on ferrous oxalate. For example, calcium hydroxide decomposes the ferrous oxalate with the formation of calcium oxalate and iron oxide which have been shown by field tests to be entirely ineffective in restoring chlorotic foilage to its normal green color.

Another object of the present invention is to make possible the conjoint use of ferrous oxalate and basic copper sulfate on growing plants, by the combination of these two materials with a stabilizing agent which reduces or prevents the aforesaid reaction and thus practically eliminates the aforesaid adverse effects on the growing plants, but which does not interfere with the desired beneficial effects on the plant.

It has now been found that the foregoing disadvantage can be eliminated and that ferrous oxalate is rendered compatible with basic copper sulfate when these two materials are combined with a third material selected from the following group, namely, basic zinc sulfate, basic zinc carbonate, zinc oxide, basic zinc chloride, basic zinc chloride sulfate, tribasic zinc phosphate, manganous oxide, manganic oxide and manganese dioxide. Of these materials, basic zinc sulfate appears to be the most effective stabilizing agent and is therefore preferred in most cases. But manganous oxide can be used to advantage in cases of manganese-deficient soils.

The amount of stabilizing agent to be added to the mixture of ferrous oxalate and basic copper sulfate may be relatively small. For example, from 6 to 10 parts by weight of basic zinc sulfate (e. g., $ZnSO_4 \cdot 4Zn(OH)_2 \cdot 2H_2O$) can be used with 100 parts of a mixture containing equal parts of ferrous oxalate and basic copper sulfate. In such a combination, the solubility of the copper compound is only about 6 p. p. m. and the solubility of the ferrous oxalate is only about 10 p. p. m. as compared with 160 p. p. m. and 130 p. p. m. respectively in the absence of the basic zinc sulfate as stated above.

Basic zinc carbonate and the other zinc compounds mentioned can be used in about the same concentrations as basic zinc sulfate, but the manganese compounds are somewhat less effective. For example, when manganous oxide is used in the proportion of 6–10 parts to 100 parts of a mixture containing equal parts of ferrous oxalate and basic copper sulfate, the solubility of the basic copper sulfate is about 40 p. p. m. and that of ferrous oxalate is about 10 p. p. m., as compared with the values set forth above in the case of basic zinc sulfate. By increasing the concentration of manganous oxide to 20 parts per 100 parts of the aforesaid mixture, the solubility of the basic copper sulfate is reduced to about 20 p. p. m.

It will be understood that the proportions set forth above are not limiting, and that the use of smaller amounts of the stabilizing agents may be permissible. For example, basic zinc sulfate is an effective stabilizer in concentrations as low as 4 parts per 100 parts of ferrous oxalate-basic copper sulfate mixture, but ordinarily at least 6 parts are desirable. On the other hand, increasing the amounts of the stabilizing agents above the values set forth above is permissible, and may be desirable where this agent is to contribute a nutritional or other beneficial effect in addition to its stabilizing action. In any event, however, the amount of this third ingredient will not exceed the combined amounts of the other two, and as a rule it will fall within the ranges given above.

The combination of ferrous oxalate and basic copper sulfate with a stabilizing agent such as basic zinc sulfate, for example, makes it possible to apply the nutritional iron and the copper fungicide to the growing plant in a single spray or dust treatment. Not only are time and labor thus saved, but also the possibility of simultaneous application of both materials permits immediate treatment of the plant for either nutritional deficiency or fungus disease whenever they appear and avoids delays that would otherwise necessarily intervene between successive applications of ferrous oxalate and basic copper sulfate. Field tests have shown that the ferrous oxalate in such compositions retains its effectiveness in supplying nutritional iron to the plant as disclosed in my aforesaid application, and that the basic copper sulfate retains its normal fungicidal properties but is harmless to the plant.

A further advantage of the combination of ferrous oxalate with basic copper sulfate and a stabilizing agent resides in the unusually good adherence of this composition to foliage which is of great importance, especially in the case of glossy citrus foliage which in most cases is sprayed only twice a year. Basic copper sulfate is not naturally adherent and an appropriate adhesive is necessary to prevent washing away of the spray residue under normal conditions of rainfall. But commercially available adhesive materials are very specific in their performance, and also must be tested for their compatibility with basic copper sulfate since many of them reduce the availability of the copper and thus the desired fungicidal effect. Ferrous oxalate, however, is naturally a powerful adhesive material, and in the presence of basic zinc sulfate it acts as a superior adhesive for basic copper sulfate as shown by the following tabulated comparison with other conventional adhesives. In these tests, two pounds of adhesive material and four pounds of basic copper sulfate were used per 100 gallons of water. About one fourth pound of basic zinc sulfate was also used in each test.

| Adhesive material | Cu deposit in mg./cm.² | | Percent adhesive |
| --- | --- | --- | --- |
| | Just after spraying | 10 days after spraying | |
| 1. Ferrous oxalate | 3.33 | 2.46 | 74.0 |
| 2. Bentonite | 2.80 | 1.02 | 36.0 |
| 3. Soya flour | 2.90 | 0.65 | 22.5 |
| 4. Casein | 3.12 | 0.90 | 29.0 |

Thus spray residues from compositions embodying the invention remain on the foliage of the plant even when subjected to heavy rains following application, as shown by the above results. This improvement in adherence of the spray residues containing ferrous oxalate is of higher magnitude when the spray composition also contains basic zinc sulfate which renders it safe for plants. Also the ferrous oxalate retains its effectiveness as a nutritional material, as shown by the rapid response of chlorotic citrus plants and grasses in field tests, whereas no copper injury appears when basic zinc sulfate is included. Thus immediate application of the mixture can be made whenever either nutritional deficiency or fungus infection appears, and full advantage can be taken of the economy of a single application for both purposes.

Several processes are known for the manufacture of ferrous oxalate, which can be used in preparing the material for the above purposes, but the following procedure is preferred in which ferrous sulfate is reacted with oxalic acid. It has been found that this reaction is essentially complete at a temperature of 160° F.–170° F., but that temperatures higher than 170° F. during the reaction or subsequent drying may cause decomposition.

The following is an example of the preferred process:

75 pounds of ferrous sulfate (FeSO$_4$.7H$_2$O) were dissolved in 50 gallons of water, and 30 pounds of technical oxalic acid (H$_2$C$_2$O$_4$.2H$_2$O) were dissolved in 20 gallons of hot water in a separate tank. The amounts of iron sulfate and oxalic acid used were not the same as would be used on a molecular ratio basis because both materials were of technical grade. The oxalic acid solution was added to the ferrous sulfate solution and heated, with agitation, to 160–170° F. for about 1½ hours at the end of which the reaction was complete and a bright canary yellow color had developed. The reaction was as follows:

$$FeSO_4 + H_2C_2O_4 \rightarrow FeC_2O_4 + H_2SO_4$$

The ferrous oxalate precipitate was allowed to settle, and was washed with water, by decantation, until most of the soluble sulfates were removed. The ferrous oxalate sludge was then filtered on a rotary filter, with washing until the filter cake, in water suspension, had a pH of 6.8–7.0. The filter cake was dried at a temperature not above 170° F. This cake was finely divided and suitable for either spray drying or flash drying in actual production.

It will be understood that the invention is not restricted to the details set forth in the foregoing description, since various changes can be made without departing from its spirit. Reference should therefore be had to the appended claims for a definition of the limits of the invention.

What is claimed is:

1. The method of supplying nutritional iron to plants growing in iron-deficient soil which comprises supplying iron to the plant in the form of ferrous oxalate in contact with the tissues of the growing plant.

2. A nutritional and fungicidal composition for application to the foliage of growing plants comprising a mixture of ferrous oxalate and basic copper sulfate containing a minor proportion of a stabilizing agent selected from the group consisting of basic zinc sulfate, basic zinc carbonate, zinc oxide, basic zinc chloride, basic zinc chloride sulfate, tribasic zinc phosphate, manganous oxide, manganic oxide, and manganese dioxide.

3. A composition as defined in claim 2, containing about 6 to 20 parts by weight of said stabilizing agent to 100 parts of said mixture.

4. A composition as defined in claim 2, said mixture comprising substantially equal proportions of ferrous oxalate and basic copper sulfate and said composition containing about 6 to 20 parts by weight of said stabilizing agent to 100 parts of said mixture.

5. A nutritional and fungicidal composition for application to the foliage of growing plants comprising a mixture of ferrous oxalate and basic copper sulfate in substantially equal proportions and containing 6 to 10 parts by weight of basic zinc sulfate to 100 parts of said mixture.

6. A nutritional and fungicidal composition for application to the foliage of growing plants comprising a mixture of ferrous oxalate and basic copper sulfate in substantially equal proportions and containing about 20 parts of manganous oxide to 100 parts of said mixture.

References Cited in the file of this patent
UNITED STATES PATENTS 1,251,742   Blumenberg _____ Jan. 1, 1918

OTHER REFERENCES

Hackh's Chem. Dict., 3rd., ed., 1950, page 338.